(12) United States Patent
Higuchi et al.

(10) Patent No.: US 9,108,722 B2
(45) Date of Patent: Aug. 18, 2015

(54) AIRCRAFT AND AIRCRAFT CONTROL METHOD (71) Applicant: MITSUBISHI HEAVY INDUSTRIES, LTD., Tokyo (JP)

(72) Inventors: Yosuke Higuchi, Tokyo (JP); Takeshi Matsuda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/241,232

(22) PCT Filed: Oct. 12, 2012

(86) PCT No.: PCT/JP2012/076390
§ 371 (c)(1),
(2) Date: Feb. 26, 2014

(87) PCT Pub. No.: WO2013/058173
PCT Pub. Date: Apr. 25, 2013

(65) Prior Publication Data
US 2014/0191087 A1 Jul. 10, 2014

(30) Foreign Application Priority Data

Oct. 18, 2011 (JP) ................................. 2011-229201

(51) Int. Cl.
*G05D 1/08* (2006.01)
*B64C 13/16* (2006.01)
(Continued)

(52) U.S. Cl.
CPC ................. *B64C 13/16* (2013.01); *B64C 13/04* (2013.01); *B64C 13/28* (2013.01); *B64C 13/44* (2013.01); *B64C 13/503* (2013.01); *B64C 27/57* (2013.01)

(58) Field of Classification Search
None
See application file for complete search history.

(56) References Cited

U.S. PATENT DOCUMENTS 4,198,017 A * 4/1980 Murray .......................... 244/221
4,373,184 A * 2/1983 Lambregts ........................ 701/3
(Continued)

FOREIGN PATENT DOCUMENTS

JP 3195918 8/2001

OTHER PUBLICATIONS

International Search Report issued Jan. 8, 2013 in International Application No. PCT/JP2012/076390.
(Continued)

*Primary Examiner* — Christopher P Ellis
*Assistant Examiner* — Medhat Badawi
(74) *Attorney, Agent, or Firm* — Wenderoth, Lind & Ponack, L.L.P.

(57) ABSTRACT

An aircraft is provided with a mechanical linkage that mechanically transmits an amount of manipulation of a control stick to a rudder controlling mechanism, an amount-of-manipulation sensor that detects the amount of manipulation, and an FBW control-law computing unit that calculates an FBW control-law command indicating an amount of control for a craft in accordance with the detected amount of manipulation. Also, with the aircraft, a high-pass filter outputs, among the control-stick manipulation amounts detected by the amount-of-manipulation sensor, an amount of change in the control-stick manipulation amounts; by subtracting the amount of change that has passed through the high-pass filter by means of the subtracting portion, the FBW control-law command serves as an SAS command; and the rudder controlling mechanism is driven by adding an amount of movement of an SAS actuator in accordance with the SAS command to the control-stick manipulation amount transmitted by the mechanical linkage.

3 Claims, 6 Drawing Sheets (51) Int. Cl.
*B64C 27/57* (2006.01)
*B64C 13/04* (2006.01)
*B64C 13/28* (2006.01)
*B64C 13/44* (2006.01)
*B64C 13/50* (2006.01)

(56) References Cited

U.S. PATENT DOCUMENTS

| | | | |
|---|---|---|---|
| 4,573,125 A * | 2/1986 | Koenig | 701/3 |
| 4,583,030 A * | 4/1986 | Nixon | 318/580 |
| 4,599,698 A * | 7/1986 | Fischer et al. | 701/12 |
| 4,741,501 A * | 5/1988 | Clelford et al. | 244/17.13 |
| 4,758,958 A * | 7/1988 | von Gersdorff | 701/4 |
| 4,849,900 A * | 7/1989 | Blight et al. | 701/7 |
| 4,924,400 A * | 5/1990 | Post et al. | 701/5 |
| 5,141,177 A * | 8/1992 | Wright et al. | 244/17.13 |
| 5,224,664 A * | 7/1993 | Adams et al. | 244/17.13 |
| 5,428,543 A * | 6/1995 | Gold et al. | 701/5 |
| 5,935,177 A * | 8/1999 | Cox et al. | 701/9 |
| 5,951,608 A * | 9/1999 | Osder | 701/11 |
| 6,236,914 B1 * | 5/2001 | Kaloust | 701/11 |
| 6,276,640 B1 * | 8/2001 | Laffisse et al. | 244/178 |
| 6,325,333 B1 * | 12/2001 | Najmabadi et al. | 244/181 |
| 6,334,592 B1 * | 1/2002 | Tomio et al. | 244/221 |
| 7,108,232 B2 * | 9/2006 | Hoh | 244/223 |
| 7,440,825 B2 * | 10/2008 | Einthoven et al. | 701/3 |
| 7,878,461 B2 * | 2/2011 | Hirvonen et al. | 244/223 |
| 7,984,878 B2 * | 7/2011 | Hirvonen | 244/194 |
| 8,240,617 B2 * | 8/2012 | Biest et al. | 244/223 |
| 8,342,455 B2 * | 1/2013 | Allieta et al. | 244/194 |
| 2010/0025544 A1 * | 2/2010 | Beaufrere | 244/76 R |
| 2013/0338859 A1 * | 12/2013 | Yamasaki | 701/3 |
| 2014/0231591 A1 * | 8/2014 | Higuchi et al. | 244/175 |

OTHER PUBLICATIONS

Written Opinion of the International Searching Authority issued Jan. 8, 2013 in International Application No. PCT/JP2012/076390.

* cited by examiner

AIRCRAFT AND AIRCRAFT CONTROL METHOD

TECHNICAL FIELD

The present invention relates to an aircraft and an aircraft control method.

BACKGROUND ART

Among aircraft maneuvering systems, in the case of an electrical maneuvering system generally referred to as a fly-by-wire (hereinafter referred to as "FBW") system, maneuvering characteristics are improved by performing control in which an actuator for driving a rudder controlling mechanism is given FBW control-law commands, including attitude command control that associates the amount of maneuvering of a control stick with the amount of change in attitude of an aircraft, velocity command control that associates the amount of maneuvering of the control stick with the amount of change in velocity, and so forth.

A Partial Authority Flight Control System (hereinafter referred to as "PAFCS") is a system that realizes the same control as this FBW system by using a mechanical maneuvering system in which the control stick and the rudder controlling mechanism are mechanically connected with a mechanical linkage and a linear actuator (SAS (stability augmentation system) actuator) for increasing stability.

With a PAFCS, because the control stick and the rudder controlling mechanism are mechanically connected, unlike the FBW system, it is not necessary to provide a redundant system for achieving high reliability in the control system. However, with the PAFCS, the operating range (authority) of an SAS actuator is restricted in order to allow maneuvering by a pilot even when an abnormality occurs in the control system.

As an example of PAFCS, Cited Literature 1 discloses a helicopter flight-control device constituted of a linking mechanism that drives a rudder controlling mechanism by mechanically transmitting the amount of maneuvering of a maneuvering unit to the rudder controlling mechanism, a flight-control-law computing unit that computes a flight-control law of the helicopter based on a maneuvering signal obtained by detecting the amount of maneuvering of the maneuvering unit and that outputs a driving signal for the rudder controlling mechanism, and a precision servo actuator unit that adds to the amount of maneuvering transmitted by the linking mechanism an amount of difference corresponding to a difference signal obtained by subtracting the maneuvering signal from the driving signal.

CITATION LIST

Patent Literature

PTL 1 Publication of Japanese Patent No. 3195918

SUMMARY OF INVENTION

Technical Problem

Unlike the FBW system, with the PAFCS, the rudder surface is also moved in accordance with the amount of manipulation of the control stick (control-stick manipulation amount) because the control stick and the rudder controlling mechanism are mechanically connected. Accordingly, as described in Cited Literature 1, an SAS command for driving the SAS actuator is calculated by subtracting the control-stick manipulation amount from the FBW control-law command, as shown in Expression (1).

$$\text{SAS command} = \text{FBW control-law command} - \text{control-stick manipulation amount} \quad (1)$$

However, if the control-stick manipulation amount is too high, causing the magnitude of the SAS command calculated by using Expression (1) to exceed the operating range of the SAS actuator, the SAS actuator ends up in a state in which the SAS actuator remains extended or contracted in one direction, which does not allow any further movement (saturated state). Once this state occurs, it is not possible to perform rudder surface control, that is, craft control.

The present invention has been conceived in light of the above-described circumstances, and an object thereof is to provide an aircraft and an aircraft control method with which it is possible to prevent a situation in which the craft cannot be controlled because the amount of manipulation of a control stick is too high, even if the craft maneuvering system is a PAFCS.

Solution to Problem

In order to solve the above-described problems, an aircraft and an aircraft control method of the present invention employ the following solutions.

An aircraft according to a first aspect of the present invention includes a control stick for a pilot to maneuver a craft; an amount-of-rudder-control transmitting means that mechanically transmits an amount of manipulation of the control stick to a rudder controlling means; a detecting means that detects the amount of manipulation; an amount-of-control calculating means that calculates an amount of control for the craft in accordance with the amount of manipulation detected by the detecting means; an amount-of-change outputting means that outputs, among the amounts of manipulation detected by the detecting means, an amount of change in the amounts of manipulation; a subtracting means that subtracts the amount of change output from the amount-of-change outputting means from the amount of control calculated by the amount-of-control calculating means; and an actuator that adds an amount of manipulation in accordance with a subtracted value output from the subtracting means to the amount of manipulation transmitted by the amount-of-rudder-control transmitting means.

With this configuration, the amount-of-rudder-control transmitting means mechanically transmits the amount of manipulation of the control stick to the rudder controlling means. In addition, the detecting means detects the amount of manipulation of the control stick, and the amount-of-control calculating means calculates the amount of control for the craft in accordance with that amount of manipulation.

Then, among the amounts of manipulation detected by the detecting means, the amount-of-change outputting means outputs the amount of change in the amounts of manipulation, and the subtracting means subtracts the amount of change output from the amount-of-change outputting means from the amount of control calculated by the amount-of-control calculating means. In other words, the subtracted value output from the subtracting means serves as the control command for the actuator.

The actuator adds the amount of manipulation in accordance with the subtracted value (control command) output from the subtracting means to the amount of manipulation transmitted by the amount-of-rudder-control transmitting means. In other words, the aircraft maneuvering system according to this configuration is a PAFC system in which the rudder controlling means is driven based on the sum of the amount of manipulation transmitted by the amount-of-rudder-control transmitting means and the amount of manipulation due to the actuator.

With a conventional PAFC system, a value obtained by subtracting the amount of manipulation of the control stick from the amount of control calculated by the amount-of-control calculating means is input to the actuator as the control command. However, if the amount of manipulation of the control stick is too high, because the amount of subtraction applied to the amount of control calculated by the amount-of-control calculating means becomes high, the subtracted value (control command) sometimes exceeds the operating range of the actuator. In such a case, the actuator ends up in a state in which the actuator remains extended or contracted in one direction, which does not allow any further movement (saturated state). Note that the case in which the amount of manipulation of the control stick is too high refers to, for example, a case in which the control stick is maximally tilted in one direction.

In contrast, with this configuration, when the state in which the control stick is maximally tilted in one direction is maintained, because the amount of manipulation does not change and is kept constant, the output from the amount-of-change outputting means would be 0 (zero). Accordingly, in such a case, the amount of manipulation of the control stick is not subtracted from the amount of control calculated by the amount-of-control calculating means. In other words, the amount-of-change outputting means keeps the control command input to the actuator from exceeding the operating range of the actuator.

Therefore, with this configuration, when the amount of manipulation of the control stick is too high, because that amount of manipulation is not subtracted from the amount of control calculated by the amount-of-control calculating means, it is possible to prevent a situation in which the craft cannot be controlled because the amount of manipulation of the control stick is too high.

With the above-described first aspect, it is preferable that the amount-of-change outputting means attenuate, over time, the amount of manipulation to be output when the amount of manipulation has stopped changing.

With this configuration, although the amount of control calculated by the amount-of-control calculating means is subtracted while the amount of manipulation of the control stick is changing, when the amount of manipulation of the control stick has stopped changing because, for example, a state in which the control stick is maximally tilted in one direction is maintained or the like, the amount of manipulation output from the amount-of-change outputting means is attenuated over time; therefore, the same effect is achieved as attenuating the rate of change of the amount of manipulation to be applied to the rudder controlling means via the amount-of-rudder-control transmitting means, thus reducing the likelihood of the craft responding abruptly. Then, if the state in which the amount of manipulation of the control stick does not change continues to be maintained, the craft is stabilized by using only the amount of control calculated by the amount-of-control calculating means. Therefore, it is possible to realize more stable craft control.

An aircraft control method according to a second aspect of the present invention is a method of controlling an aircraft provided with a control stick for a pilot to maneuver a craft, an amount-of-rudder-control transmitting means that mechanically transmits an amount of manipulation of the control stick to a rudder controlling means, a detecting means that detects the amount of manipulation, an amount-of-control calculating means that calculates an amount of control for the craft in accordance with the amount of manipulation detected by the detecting means, the aircraft control method including a first step of outputting, among the amounts of manipulation detected by the detecting means, an amount of change in the amounts of manipulation; a second step of subtracting the amount of change from the amount of control calculated by the amount-of-control calculating means; and a third step of driving the rudder controlling means by adding an amount of movement of the actuator in accordance with a subtracted value obtained by the subtraction performed in the second step to the amount of manipulation transmitted by the amount-of-rudder-control transmitting means.

Advantageous Effects of Invention

The present invention affords an excellent advantage in that it is possible to prevent a situation in which the craft cannot be controlled because the amount of manipulation of a control stick is too high, even if the craft maneuvering system is a PAFCS.

DESCRIPTION OF EMBODIMENT

An embodiment of an aircraft and an aircraft control method according to the present invention will be described below with reference to the drawings.

Figure 1:
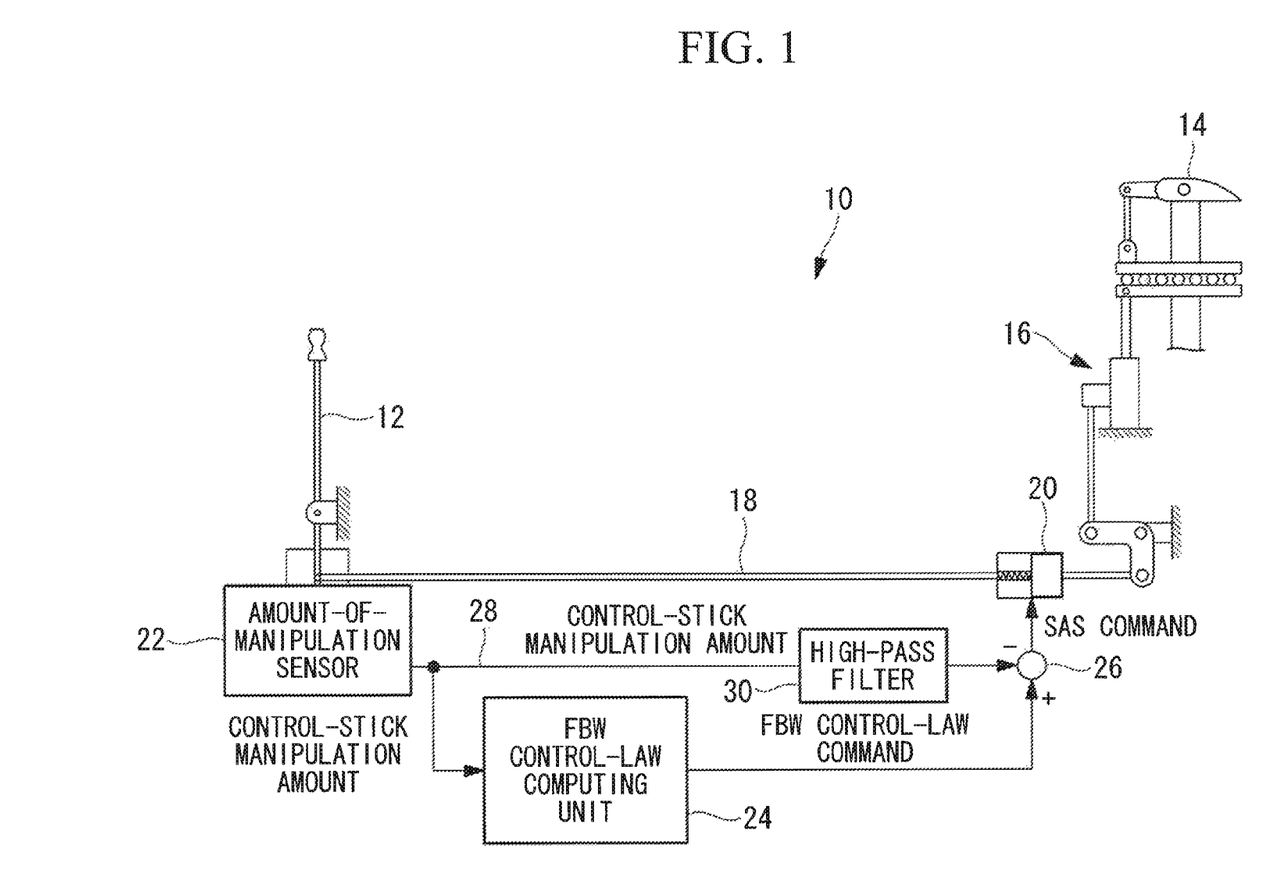
FIG. 1 is a block diagram showing the configuration related to control of an aircraft according to an embodiment of the present invention.

FIG. 1 is a block diagram showing the configuration related to control of an aircraft 10 according to this embodiment. Note that, as an example, the aircraft 10 according to this embodiment is assumed to be a helicopter. In addition, a maneuvering system of the aircraft 10 according to this embodiment is a PAFCS.

As shown in FIG. 1, the aircraft 10 is provided with a mechanical linkage 18 that mechanically transmits an amount of manipulation of a control stick 12, which allows a pilot to maneuver the craft, to a rudder controlling mechanism 16 having a rudder surface 14. The mechanical linkage 18 is connected, at one end, to the control stick 12 and is connected, at the other end, to an SAS actuator 20 that drives the rudder controlling mechanism 16.

In addition, the aircraft 10 is provided with an amount-of-manipulation sensor 22 that detects the amount of manipulation of the control stick 12 (hereinafter referred to as "control-stick manipulation amount"), and an FBW control-law computing unit 24 that calculates an amount of control of the craft in accordance with the control-stick manipulation amount detected by the amount-of-manipulation sensor 22 (hereinafter referred to as "FBW control-law command"). In addition, the control-stick manipulation amount detected by the amount-of-manipulation sensor 22 is transmitted through an amount-of-manipulation canceling line 28 and is input to a subtracting portion 26, and the FBW control-law command is also input to the subtracting portion 26.

Then, the subtracting portion 26 subtracts the control-stick manipulation amount transmitted through the amount-of-manipulation canceling line 28 from the FBW control-law command. The subtracted value generated by the subtracting portion 26 is output as an SAS command for controlling an SAS actuator 20 and is input to the SAS actuator 20.

The SAS actuator 20 drives the rudder controlling mechanism 16 based on a value obtained by adding the amount of manipulation of the control stick 12 transmitted by the mechanical linkage 18 to the SAS command output from the subtracting portion 26.

Also, the aircraft 10 according to this embodiment is provided with a high-pass filter 30 that outputs, among the control-stick manipulation amounts, an amount of change of the control-stick manipulation amounts to the amount-of-manipulation canceling line 28. The control-stick manipulation amount output from the high-pass filter 30 is input to the subtracting portion 26 and is subtracted from the FBW control-law command. Specifically, in this embodiment, the control-stick manipulation amount after passing through the high-pass filter 30 serves as the amount of subtraction applied to the FBW control-law command.

Figure 2:
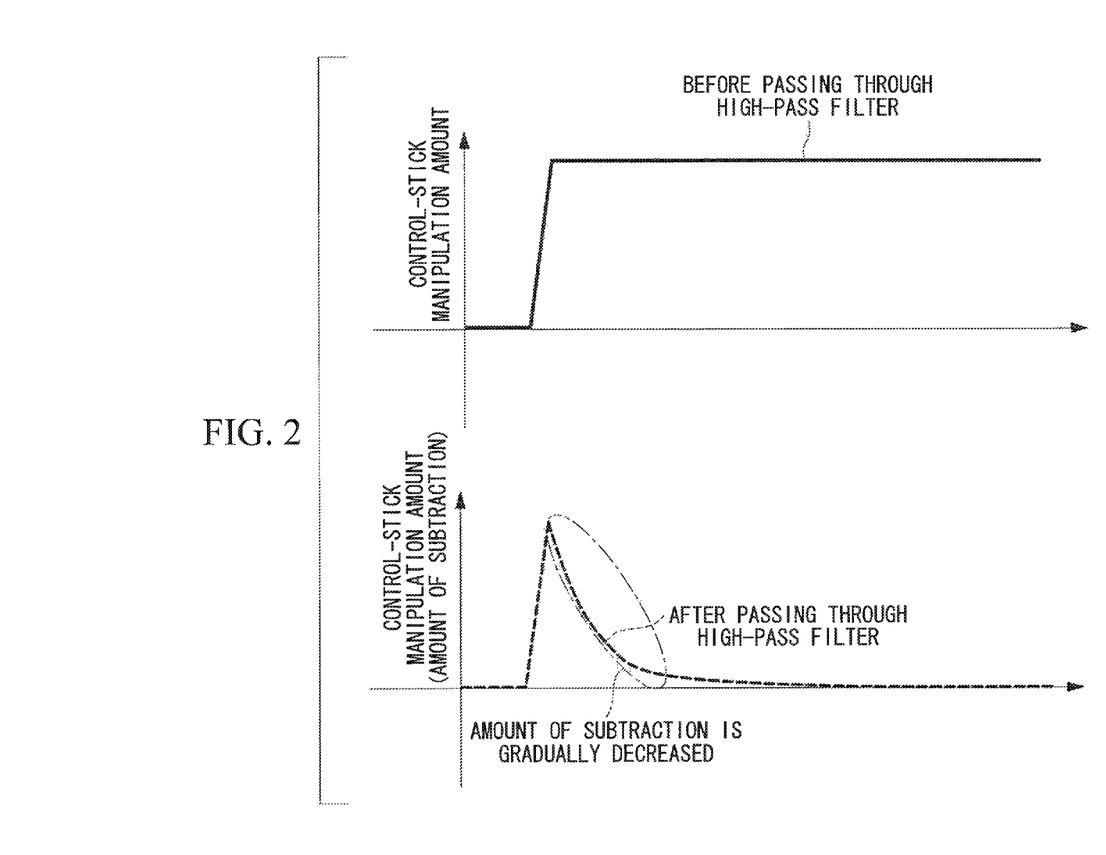
FIG. 2 is a schematic diagram showing a control-stick manipulation amount after passing through a high-pass filter according to the embodiment of the present invention.

FIG. 2 is a schematic diagram showing the control-stick manipulation amount after passing through the high-pass filter 30.

As shown in FIG. 2, in the case in which the control-stick manipulation amount changes, the high-pass filter 30 directly outputs that amount of change as the amount of subtraction without modification. On the other hand, in the case in which the control-stick manipulation amount does not change, the high-pass filter 30 outputs 0 (zero) as the amount of subtraction. Note that the case in which the control-stick manipulation amount does not change refers to a case in which, for example, a state in which the control stick 12 is maximally tilted in one direction is maintained or the like.

At this point, with a PAFC system, the value obtained by subtracting the control-stick manipulation amount from the FBW control-law command would be input to the SAS actuator 20 as the SAS command. However, with the conventional PAFC system, if the control-stick manipulation amount is too high, the SAS command sometimes exceeds the operating range of the SAS actuator 20 because the amount of subtraction applied to the FBW control-law command is high. In this case, the SAS actuator 20 ends up in a state in which the SAS actuator 20 remains extended or contracted in one direction, which does not allow any further movement (saturated state).

However, with the aircraft 10 according to this embodiment, for example, when the state in which the control stick 12 is maximally tilted in one direction is maintained, because the amount of subtraction output from the high-pass filter 30 becomes 0, subtraction is not performed on the FBW control-law command at the subtracting portion 26. In other words, the high-pass filter 30 keeps the SAS command from exceeding the operating range of the SAS actuator 20.

In addition, the high-pass filter 30 outputs the control-stick manipulation amount (amount of subtraction) while the control-stick manipulation amount is changing, and attenuates, over time, the control-stick manipulation amount (amount of subtraction) to be output when the control-stick manipulation amount has stopped changing. For example, the high-pass filter 30 according to this embodiment gradually decreases the amount of subtraction in a curve, as shown in FIG. 2. By doing so, the same effect is achieved as attenuating the rate of change of the control-stick manipulation amount to be applied to the rudder controlling mechanism 16 via the mechanical linkage 18, and thus, it is possible to reduce the likelihood of the craft responding abruptly. Subsequently, if the state in which the control-stick manipulation amount does not change is maintained, the craft is stabilized by using only the FBW control-law command calculated by the FBW control-law computing unit 24. Therefore, with the aircraft 10 according to this embodiment, it is possible to realize more stable craft control.

Next, the operation of the aircraft 10 according to this embodiment will specifically be described by comparison with a conventional maneuvering system.

Figure 3:
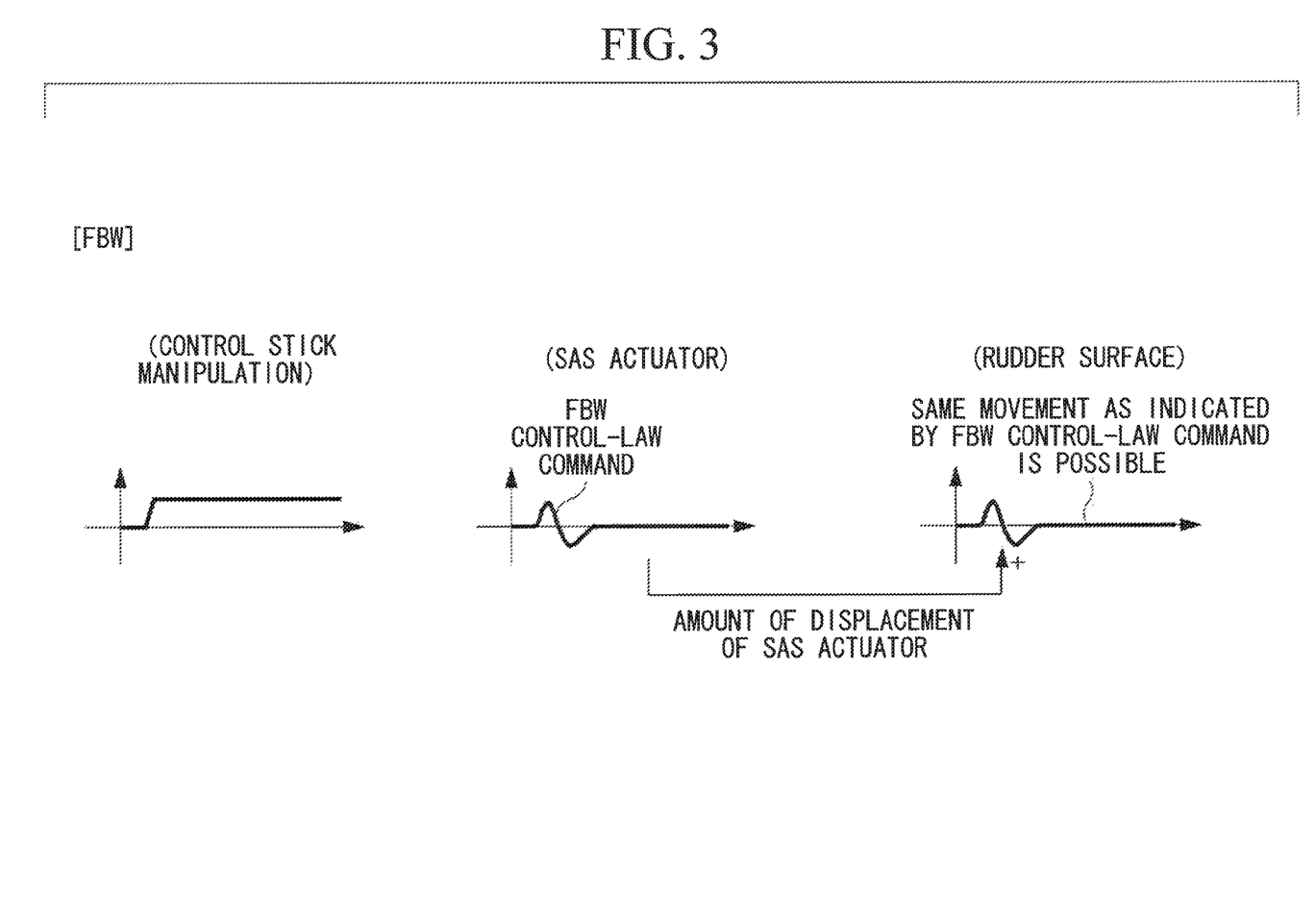
FIG. 3 is a schematic diagram showing the relationship between the magnitude of the control-stick manipulation amount and the movement of a rudder surface in an FBW system.

FIG. 3 is a schematic diagram showing the relationship between the magnitude of the control-stick manipulation amount and the movement of the rudder surface 14 in the FBW system.

In the FBW system, even if the control stick 12 is manipulated and the control-stick manipulation amount is kept constant, the FBW control-law command indicating an amount of control for the craft in accordance with the control-stick manipulation amount is calculated based on the FBW control law. Because the control stick 12 and the SAS actuator 20 are not mechanically connected, the SAS actuator 20 drives the rudder surface 14 by an amount of displacement indicated by the FBW control-law command. Because of this, as shown in FIG. 3, the rudder surface 14 is driven by the same amount of displacement as the amount of displacement indicated by the FBW control-law command.

Figure 4:
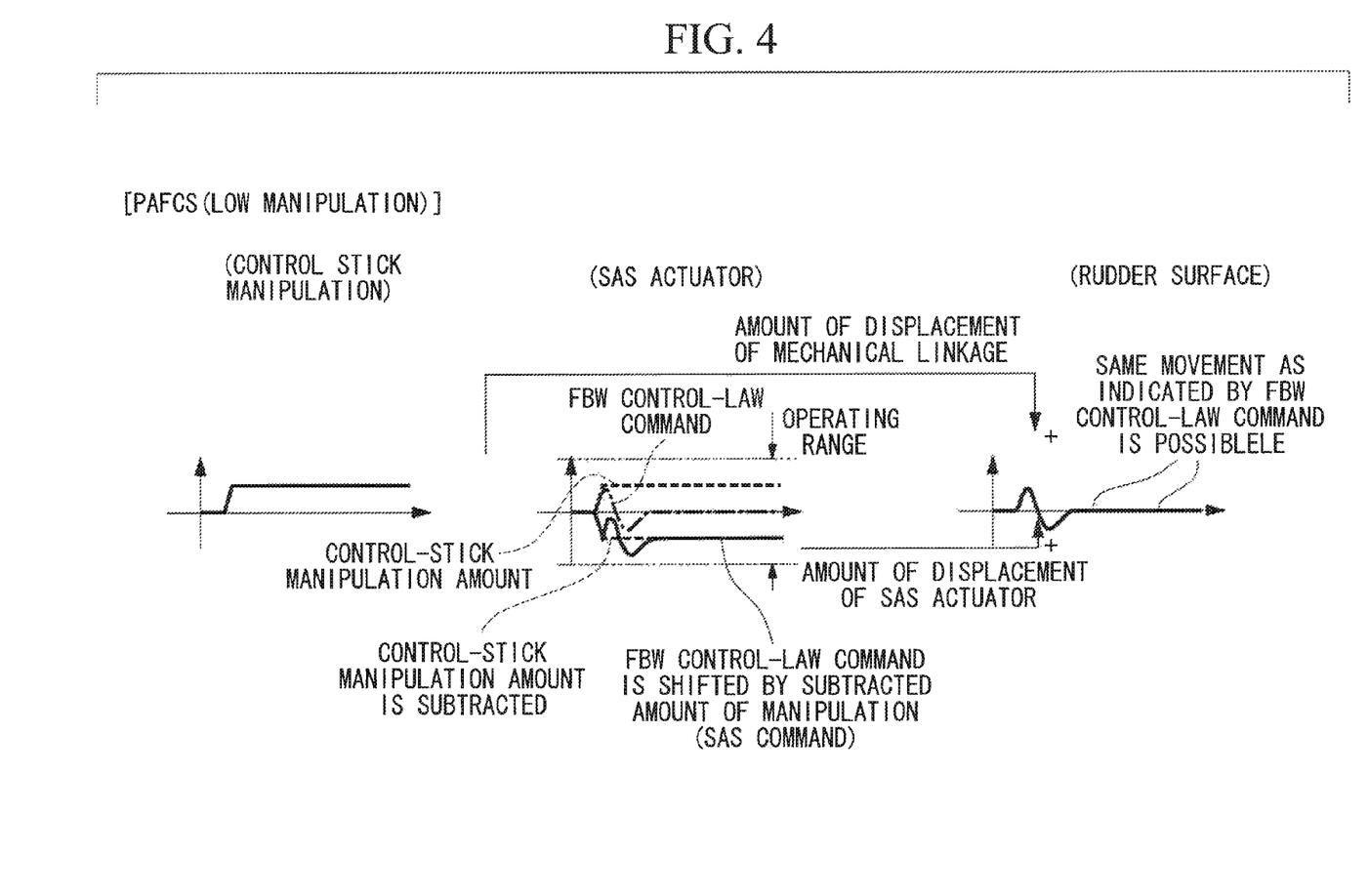
FIG. 4 is a schematic diagram showing the relationship between the control-stick manipulation amount and the movement of a rudder surface in a PAFCS, in the case in which the control-stick manipulation amount is low.

FIG. 4 is a schematic diagram showing the relationship between the control-stick manipulation amount and the movement of the rudder surface 14 in the case in which the control-stick manipulation amount is low (hereinafter referred to as "low manipulation") in the PAFCS. The low manipulation refers to a case in which the control-stick manipulation amount falls within the operating range of the SAS actuator 20.

As described above, in the PAFCS, because the control stick 12 and the SAS actuator 20 are mechanically connected, the subtracted value obtained by subtracting the control-stick manipulation amount from the FBW control-law command serves as the SAS command. In other words, by being shifted by the subtracted control-stick manipulation amount, the FBW control-law command serves as the SAS command. Then, the rudder surface 14 is driven by the sum of the amount of displacement of the mechanical linkage 18 in accordance with the control-stick manipulation amount and the amount of displacement of the SAS actuator 20 in accordance with the SAS command, that is, the same amount of displacement as the amount of displacement indicated by the FBW control-law command.

Note that, in the case of the low manipulation shown in FIG. 4, the relationship between the control-stick manipulation amount and the movement of the rudder surface 14 is the same both for the conventional PAFCS and the PAFCS according to this embodiment.

Figure 5:
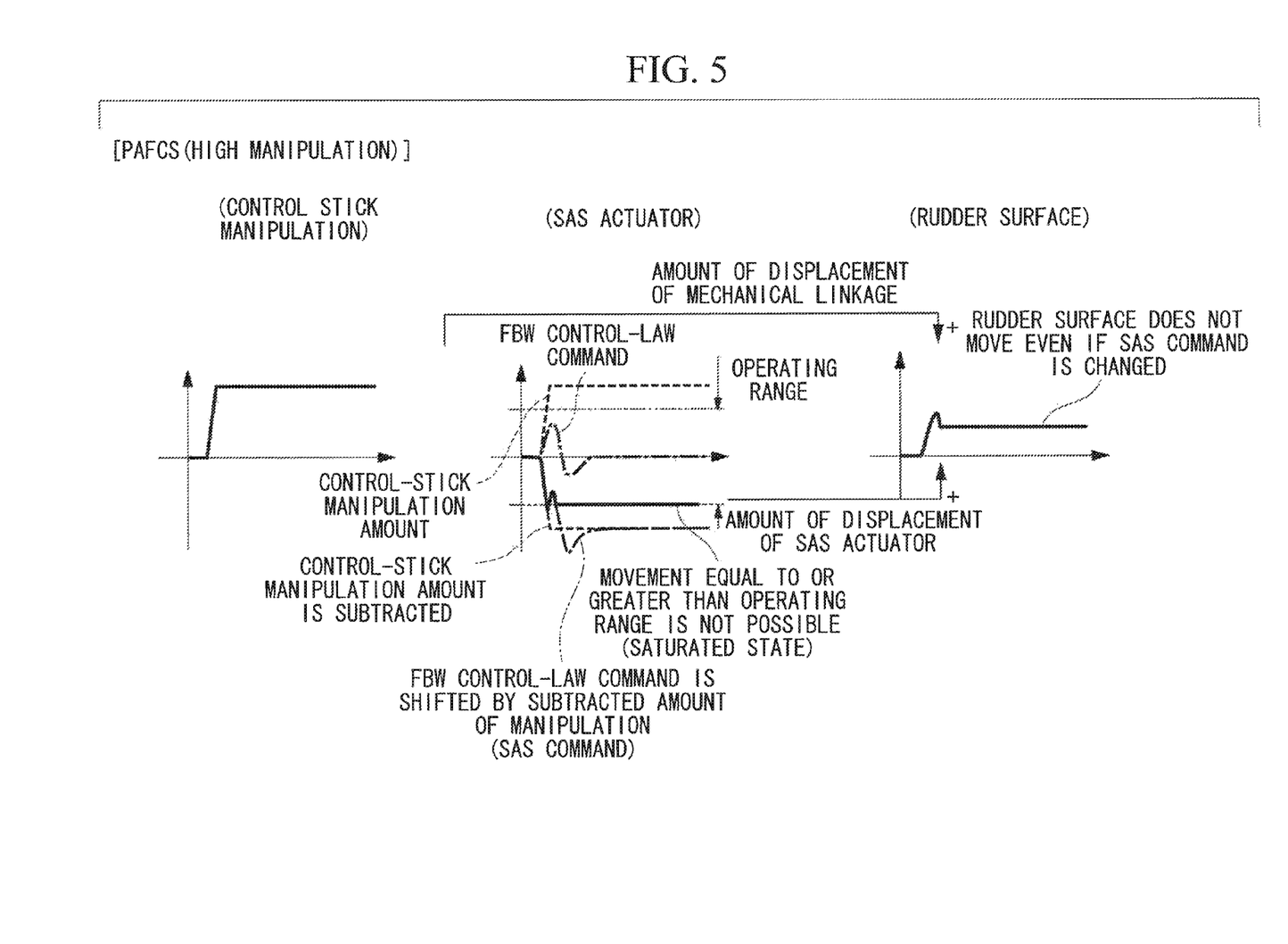
FIG. 5 is a schematic diagram showing the relationship between the control-stick manipulation amount and the movement of a rudder surface in a conventional PAFCS, in the case in which the control-stick manipulation amount is high.

FIG. 5 is a schematic diagram showing the relationship between the control-stick manipulation amount and the movement of the rudder surface 14 in the case in which the control-stick manipulation amount is high (hereinafter referred to as "high manipulation") in the conventional PAFCS. High manipulation refers to a case in which the control-stick manipulation amount exceeds the operating range of the SAS actuator 20.

As shown in FIG. 5, in the case of high manipulation, because the control-stick manipulation amount exceeds the operating range of the SAS actuator 20, the SAS command in which the control-stick manipulation amount is subtracted from the FBW control-law command also exceeds the operating range of the SAS actuator 20. Therefore, the SAS actuator 20 cannot be moved in a range equal to or greater than the operating range, and the actuator remains extended or contracted in one direction, thus reaching the saturated state where no further movement is allowed.

Because of this, although the amount of displacement of the rudder surface 14 becomes equal to the sum of the amount of displacement of the mechanical linkage 18 and the amount of displacement of the SAS actuator 20, as described above, a displacement in accordance with the SAS command cannot be achieved.

Figure 6:
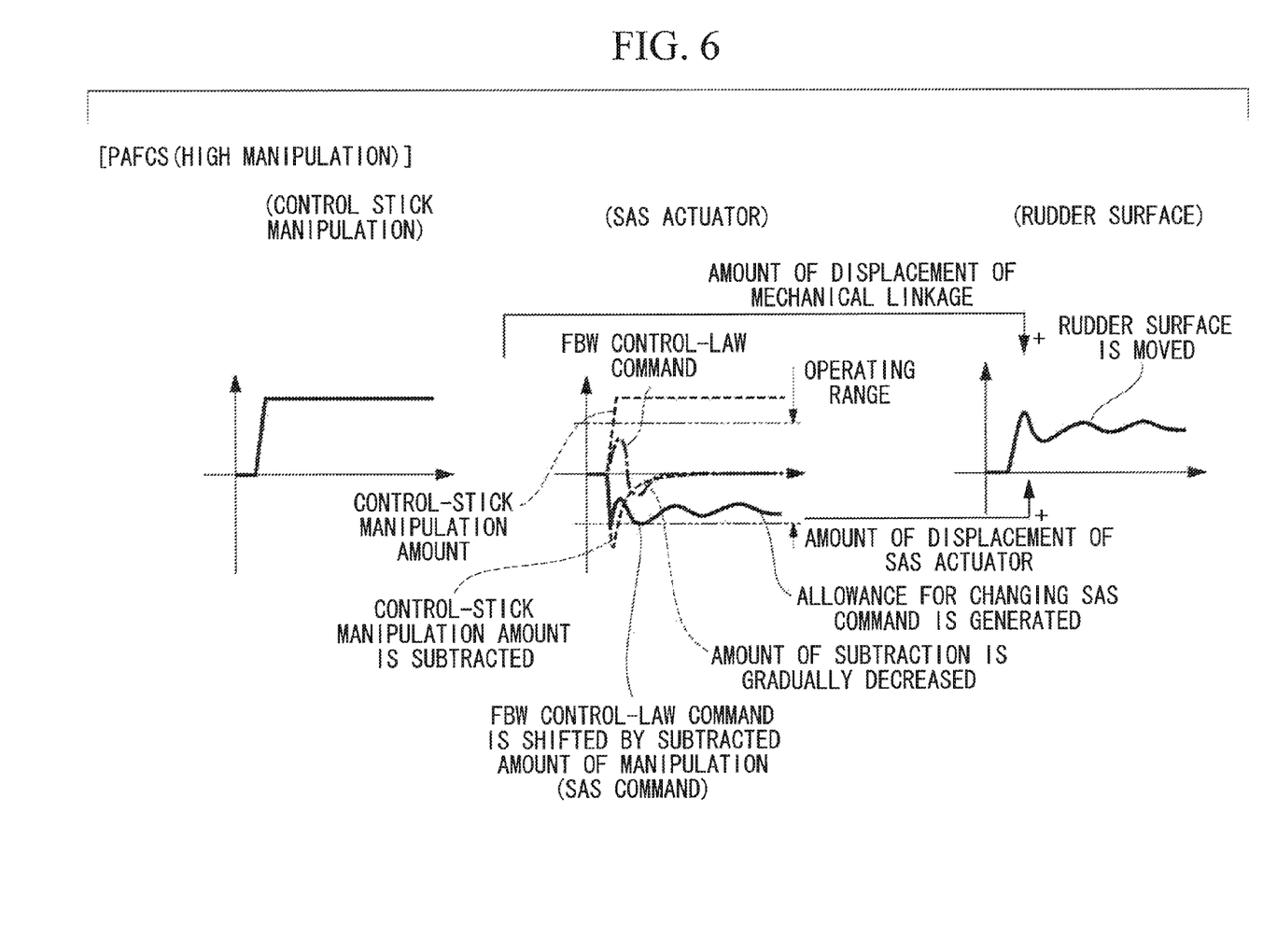
FIG. 6 is a schematic diagram showing the relationship between the control-stick manipulation amount and the movement of a rudder surface in a PAFCS according to this embodiment, in the case in which the control-stick manipulation amount is high.

FIG. 6 is a schematic diagram showing the relationship between the control-stick manipulation amount and the movement of the rudder surface 14 in the case in which high manipulation is performed in the PAFCS according to this embodiment.

As shown in FIG. 6, in this embodiment, the high-pass filter 30 outputs the amount of change in the control-stick manipulation amounts as the amount of subtraction to be applied to the FBW control-law command, whereas there is no output therefrom in the case of a constant control-stick manipulation amount with no change. This control-stick manipulation amount with no output corresponds to the control-stick manipulation amount exceeding the operating range of the SAS actuator 20. Note that, also in the case shown in FIG. 6, when the control-stick manipulation amount becomes constant, the amount of subtraction is gradually decreased.

Subtracting the amount of subtraction output from the high-pass filter 30 in this way from the FBW control-law command means that the SAS command absorbs the control-stick manipulation amount for the initial manipulation of the control stick 12 and does not absorb the control-stick manipulation amount that has become constant. Accordingly, the SAS command falls within the operating range even if the control-stick manipulation amount exceeds the operating range of the SAS actuator 20, thus generating an allowance for moving the SAS actuator 20.

As a result, even if the control-stick manipulation amount exceeds the operating range of the SAS actuator 20, the rudder surface 14 is driven using the sum of the amount of displacement of the mechanical linkage 18 in accordance with the control-stick manipulation amount and the amount of displacement of the SAS actuator 20 in accordance with the SAS command.

As has been described above, with the aircraft 10 according to this embodiment, the high-pass filter 30 outputs, among the control-stick manipulation amounts detected by the amount-of-manipulation sensor 22, the amount of change in the control-stick manipulation amounts, and, by subtracting the amount of change that has passed through the high-pass filter 30 by means of the subtracting portion 26, the FBW control-law command serves as the SAS command. Then, with the aircraft 10 according to this embodiment, the rudder controlling mechanism 16 is driven by adding the amount of movement of the SAS actuator 20 in accordance with the SAS command to the control-stick manipulation amount transmitted by the mechanical linkage 18.

Therefore, with the aircraft 10 according to this embodiment, it is possible to prevent a situation in which the craft cannot be controlled because the amount of manipulation of the control stick 12 is too high.

In addition, with the high-pass filter 30 according to this embodiment, because the amount of subtraction to be output is attenuated over time in the case in which the control-stick manipulation amount has stopped changing, it is possible to realize more stable craft control.

As above, although the present invention has been described by using the embodiment described above, the technical scope of the present invention is not limited to the scope of the embodiment described above. It is possible to incorporate various alterations or improvements into the above-described embodiment within a range that does not depart from the scope of the invention, and the technical scope of the present invention also encompasses forms into which such alterations or improvements are incorporated.

For example, although the above-described embodiment has been described in terms of a form in which the amount of subtraction is gradually decreased in a curve by the high-pass filter 30 when the control-stick manipulation amount has stopped changing, the present invention is not limited thereto, and a form in which the amount of subtraction is linearly decreased or decreased in a step-wise manner may be employed.

REFERENCE SIGNS LIST 10 aircraft
12 control stick
14 rudder surface
16 rudder controlling mechanism
18 mechanical linkage
20 SAS actuator
22 amount-of-manipulation sensor
24 FBW control-law computing unit
26 subtracting portion
28 amount-of-manipulation canceling line
30 high-pass filter

The invention claimed is:

1. An aircraft comprising:
a control stick for a pilot to maneuver a craft;
an amount-of-rudder-control transmitting part that mechanically transmits an amount of manipulation of the control stick to a rudder controlling part;
a detecting part that detects the amount of manipulation;
an amount-of-control calculating part that calculates an amount of control for the craft in accordance with the amount of manipulation detected by the detecting part;
an amount-of-change outputting part that outputs, among the amounts of manipulation detected by the detecting part, an amount of change in the amounts of manipulation;
a subtracting part that subtracts the amount of change output from the amount-of-change outputting part from the amount of control calculated by the amount-of-control calculating part; and
an actuator that adds an amount of manipulation in accordance with a subtracted value output from the subtracting part to the amount of manipulation transmitted by the amount-of-rudder-control transmitting part.

2. An aircraft according to claim 1, wherein the amount-of-change outputting part attenuates, over time, the amount of manipulation to be output when the amount of manipulation has stopped changing.

3. An aircraft control method which is a method of controlling an aircraft provided with a control stick for a pilot to maneuver a craft, an amount-of-rudder-control transmitting part that mechanically transmits an amount of manipulation of the control stick to a rudder controlling part, a detecting part that detects the amount of manipulation, an amount-of-control calculating part that calculates an amount of control for the craft in accordance with the amount of manipulation detected by the detecting part, the aircraft control method comprising:

a first step of outputting, among the amounts of manipulation detected by the detecting part, an amount of change in the amounts of manipulation;

a second step of subtracting the amount of change from the amount of control calculated by the amount-of-control calculating part; and a third step of driving the rudder controlling part by adding an amount of movement of the actuator in accordance with a subtracted value obtained by the subtraction performed in the second step to the amount of manipulation transmitted by the amount-of-rudder-control transmitting part.

* * * * *